(12) United States Patent
Jiang

(10) Patent No.: US 9,883,638 B2
(45) Date of Patent: Feb. 6, 2018

(54) METHOD AND DEVICE OF WEAKENING TORNADO

(71) Applicant: Liping Jiang, Xiamen (CN)

(72) Inventor: Liping Jiang, Xiamen (CN)

( * ) Notice: Subject to any disclaimer, the term of this patent is extended or adjusted under 35 U.S.C. 154(b) by 295 days.

(21) Appl. No.: 14/700,152

(22) Filed: Apr. 30, 2015

(65) Prior Publication Data

US 2015/0327448 A1 Nov. 19, 2015

(30) Foreign Application Priority Data

May 19, 2014 (CN) .......................... 2014 1 0209868
Apr. 13, 2015 (CN) .......................... 2015 1 0171967

(51) Int. Cl.
*A01G 15/00* (2006.01)

(52) U.S. Cl.
CPC ................................... *A01G 15/00* (2013.01)

(58) Field of Classification Search
CPC ....................................................... A01G 15/00
USPC ................................................. 239/2.1, 14.1
See application file for complete search history.

(56) References Cited

U.S. PATENT DOCUMENTS

| 4,362,280 A * | 12/1982 | McCambridge ....... A01G 15/00 239/14.1 |
| 8,634,051 B1 * | 1/2014 | Shiban ................... A01G 15/00 352/202 |
| 2010/0276533 A1 * | 11/2010 | Gravina ................. A01G 15/00 244/3.11 |
| 2011/0198407 A1 * | 8/2011 | Pop ........................ A01G 15/00 239/2.1 |

* cited by examiner

*Primary Examiner* — Ryan A Reis
(74) *Attorney, Agent, or Firm* — Wayne & Ken, LLC; Tony Hom

(57) ABSTRACT

The field of this invention is tornado disaster. This invention proposes a method of weakening tornado, the contents are as follows: A. provide Provide plenty of non-fixed turbolators, called free turbolators; B. Provide plenty of turbolators fixed on free ropes, called free turbolator strings; C. Provide plenty of turbolators fixed on ropes installed on storage boxes at lease in one spot, called swinging turbolator strings; D. Install free turbolators, free turbolator strings and swinging turbolator strings, in order to reduce energy of tornado cyclone. On the other hand, this invention also proposes a device for weakening tornado based on the above method, the contents are as follows: there are free turbolators, free turbolator strings and swinging turbolator strings which are installed in proper areas. This invention is for reducing tornado energy, and even interrupting tornado.

6 Claims, 2 Drawing Sheets

Diagram of device structure

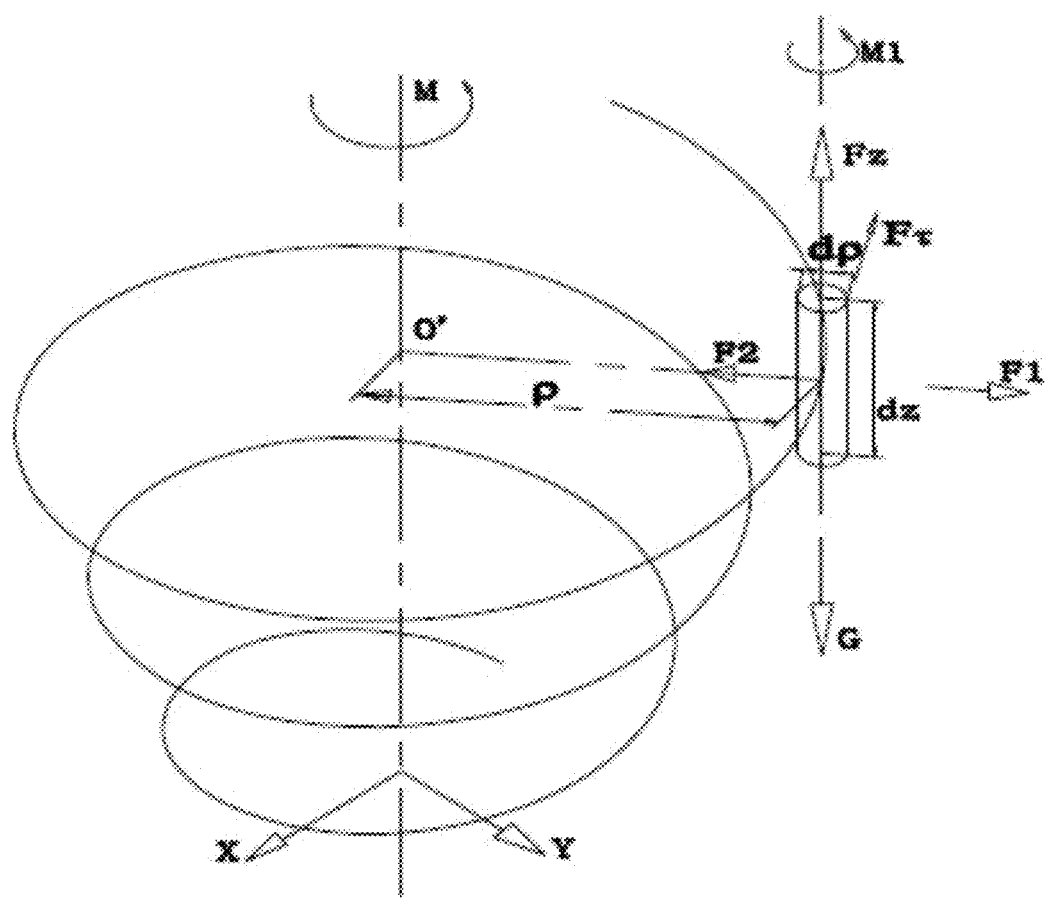
Figure 1   Diagram of force analysis of particle in tornado

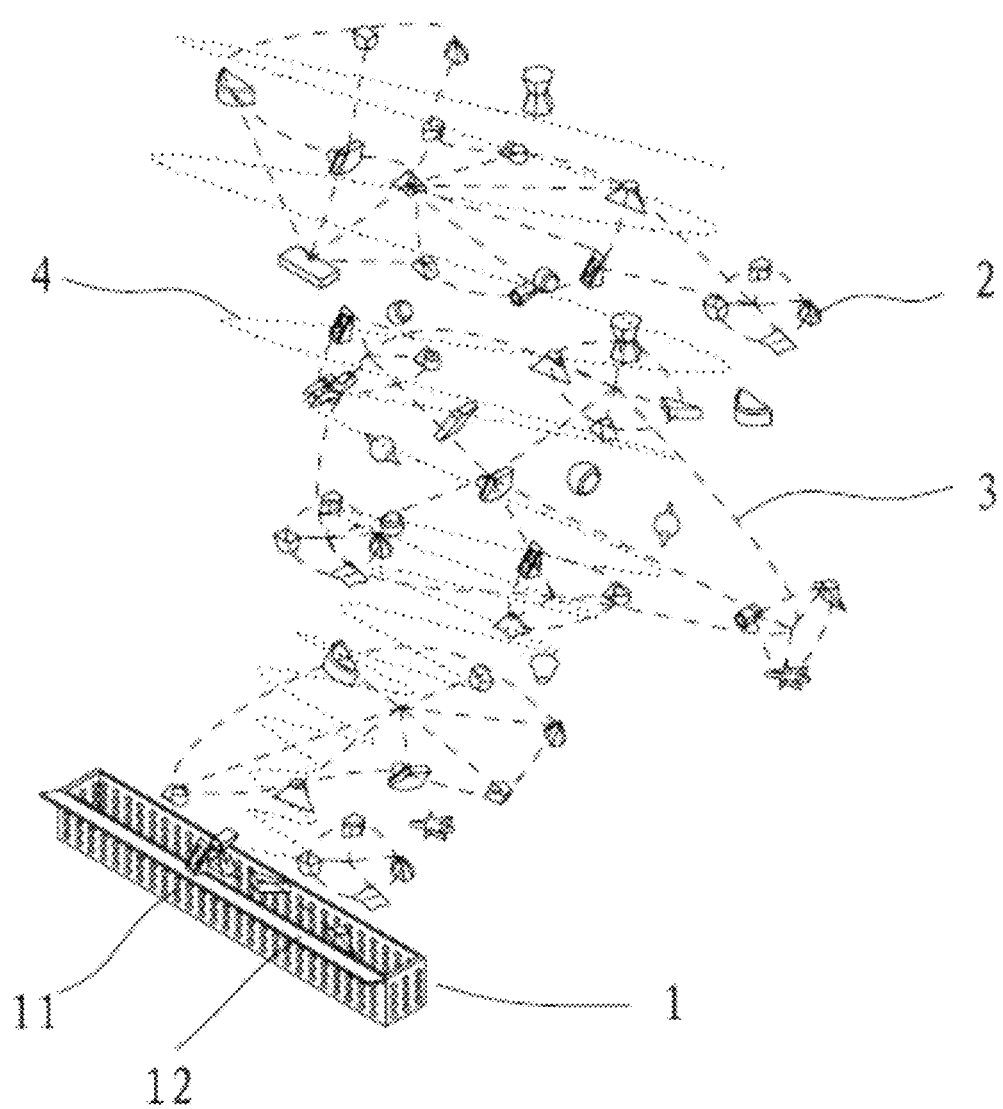
Figure 2 Diagram of device structure

METHOD AND DEVICE OF WEAKENING TORNADO

TECHNICAL FIELD

The present invention relates to the field of tornado disaster prevention, and more specifically, to a method for weakening tornado and a device thereof.

BACKGROUND OF INVENTION

Tornado usually occurs in unstable, high temperature and humid air mass, the great temperature difference between ground and high altitude causes the rapid drop of cold air and the speedy rise of hot air, then strong air convection generates a strong wind vortex with a high-speed rotating funnel-shape cloud column.

Tornado is generation of thunderstorm in cloud, to be specific, tornado is a form of energy that released intensively in a small area from the part of tremendous energy of thunderstorm. The generation of tornado could be divided into 4 steps:

(1). The instability of atmosphere generates strong upwind, which is strengthened strengthen by the effects of peak transit flow in supercritical flow.

(2). The updraft begins to rotate in the middle of troposphere due to interaction with the wind which has shear transformation on velocity and direction in vertical direction, and forms mesocyclone.

(3). With the extension to ground and sky, the mesocyclone turns to be thinner and stronger. Meanwhile, an air enhancement in a small area will generate a cyclone, and then turn into the core of tornado.

(4). The rotation of tornado core is different from that of cyclone, it is strong enough to extend tornado to the ground. When the developing vortex reaches ground, the pressure on ground decrease rapidly, and wind speed rise sharply, finally a tornado with strong cyclone is formed.

To analyze from electric field—one formation condition of tornado: only huge cumulonimbus could generate tornado, in the process of discharging between cloud and sky, the positive charge on top of cloud is far more than negative charge under cloud, after charge neutralization of lightning, there is lack of negative charge under cloud, and the cloud with a large number of positive charge will generate strong electric field between cloud and earth. Under the effect of electrostatic attraction, the cloud with positive charge will extend to earth, then the atmosphere with negative charge will be gathered for charge neutralization. Finally, there will be a funnel cloud, with high speed rotating atmosphere, generated from bottom of cumulonimbus.

The cumulonimbus will extend to earth or sea rapidly if there is enough positive charge in cloud, then the tornado will come when it reaches ground or water surface. The cloud column tornado is cloud cluster airflow moving downwards with plenty of positive charge, there is a strong electric field between cloud and earth. Although the electric field is not strong enough to generate lightning, it could cause powerful negative ions flow on earth or sea, after generation of negative ions flow, the air rises sharply and produces an area of low pressure, and ambient air would be gathered to this area under the action of atmospheric pressure, gathered air rise rapidly under negative ions flow, and gathered airflow is affected by deflecting force of earth rotation. Tornado counterclockwise rotates in the northern hemisphere, and clockwise rotates in the southern hemisphere. In this way, the pressure in the bottom of tornado gets lower and lower, and wind speed gets faster and faster.

Tornado is one of the strongest vortex phenomenon in atmosphere, and has strong effect of sucking. The ambient air rotates around axis of tornado quickly, under the attraction of pressure decease from tornado core, air would be sucked into vortex bottom near the earth in a dozens of meters thick layer, then become the upward vortex around the tornado axis. The pressure in tornado center is ten percent lower than that of ambient air.

United States is a tornado-prone area. Geology Professor Randy from Arizona State University explained that there are 80% to 90% tornado occurred in America from world wide range. There are 5 tornado on average occurs every day, and for years there will be 1000 to 2000 tornado, especially in Oklahoma, Kansas, Nebraska and Iowa. American tornado is not only known as quantity, but also strength, so this make America be 'hometown of tornado.

Tornado is a kind of catastrophic climate, which contain a large amount of energy. When the diameter of funnel vortex reach 200 meters, its cyclone power could be 30000 MW, which is equal to 10 large hydropower station's total electricity capacity. At the moment, the main method to defense tornado disaster are focusing on monitor and prediction, however, there is lack of man-made interference to reduce the power of tornado.

SUMMARY OF THE INVENTION

The purpose of this invention is to provide a method for weakening tornado, and the technical scheme is as follows A method of weakening tornado includes:

A. Providing plenty of non-fixed turbolators, which is called free turbolators;

B. Providing plenty of turbolators fixed on ropes, and free ropes are not fixed, which is called free turbolator strings;

C. Providing plenty of turbolators fixed on ropes and at least one point of the ropes are fixed, which is called swinging turbolator strings;

D. Installing the free turbolators, free turbolator strings and swinging turbolator strings to weaken cyclone energy of tornado.

Further, the method includes:

E. Connect free turbolator strings and/or swinging turbolator strings to be net structure.

Further description includes:

F. Storing the free turbolators, free turbolator strings and swinging turbolator strings in advance.

Further more, turbolators are made of lightweight materials.

Further more, turbolators are made of insulating materials.

Further more, the barycenters of turbolator is not geometric center.

Further more, turbolators have different shapes, sizes and mass.

Further more, surfaces of turbolator are rough.

Further more, there are three types of turbolators, including solid turbolators and/or hollow turbolators and/or inflatable turbolators.

Further more, turbolators are made of flexible material.

Further more, plenty of turbolators fixed on the ropes are chosen randomly.

The other purpose of this invention is to provide a device for weakening tornado based on the above method.

A device for weakening tornado includes:

Plenty of non-fixed and independent turbolators, which is called free turbolators;

Plenty of turbolators fixed on several free ropes, which is called free turbolator strings;

Plenty of turbolators fixed on ropes and at least one point of the ropes is fixed, which is called swinging turbolator strings;

Installing the free turbolators, free turbolator strings and swinging turbolator strings at proper area.

Further more, the free turbolator strings and/or swinging turbolator strings are twisted into stereo-network structure.

Further more, the external diameter of unfolded stereo-network structure is similar to the diameter of ground terminal of tornado.

Further more, the free turbolators, free turbolator strings and swinging turbolator strings are stored in storage boxes.

Further more, automatically opening or manually cover is provided on the storage boxes.

Further more, turbolators are lightweight.

Further more, turbolators are insulated.

Further more, the barycenters of turbolator is not geometric centers.

Further more, turbolators have different shapes, sizes and mass.

Further more, surfaces of turbolator are rough.

Further more, there are three types of turbolators, including solid turbolators and/or hollow turbolators and/or inflatable turbolators.

Further more, turbolators are made of flexible material.

Further more, plenty of turbolators fixed on the ropes are chosen randomly.

According to the method and device for weakening tornado, storage boxes are installed in tornado-prone areas and many lightweight turbolators whose barycenters are in and not in geometric center are installed in the storage boxes, the barycenter is dislocated with the geometric center, so that the turbolators could be blew out of the storage boxes easily and involved in tornado to do irregular movement, thereby breaking the regular swirling movement, tornado, and stable cyclone cannot be formed. On the other hand, if the surface roughness of turbolators is increased, wind resistance will be improved, thereby enhancing the destructive power of turbolators on tornado cyclone. The turbolators are made in lightweight materials in order to ensure the safety for construction and human.

The tornado is cloud cluster airflow moving downwards with plenty of positive charge, there is a strong electric field between cloud and earth. Although the electric field is not strong enough to generate lightning, it could cause powerful negative ions flow on earth or sea. The lightweight turbolators are all made of good insulation materials, and tens of thousands of turbolators can form turbolators net under the action of wind, which could isolate the electric field of tornado and decrease electric field intensity to a certain extent. If the energy of turbolators net is increased, then the energy of electric field of tornado is decreased. And if the electric field intensity is assumed as E, and the simplified formula is $E=Q/4\pi \varepsilon_0 r^2$, from which we could know that the material with high dielectric coefficient has high effect on electric field intensity.

The generation, expansion, weakening and extinction of tornado have regularities, any preventative measures to its forming condition can result in weakening and even extinction of the tornado, especially under the circumstances or environment wherein the tornado is in the initial forming stage of tornado without enough strong energy.

The device is safe and low-cost, part of tornado can be weakened, further growing and strengthening of tornado can be effectively disturbed in the initial stage, thus decreasing the damages causes by the tornado.

BRIEF DESCRIPTION OF DRAWINGS

FIG. 1 is a diagram of force analysis of particles in tornado.

FIG. 2 is a structure diagram of one embodiment of the present invention.

DETAIL DESCRIPTION OF EMBODIMENTS

Drawings are provided to describe embodiments of this invention. These figures are parts of the disclosure for explaining the embodiments and operation principle of embodiments in this invention can be explained with detailed description. And those ordinary skilled in the art can understand other possible embodiments and the beneficial effects of the present disclosure based on the detailed description. The components in figures are not drawn in proportion, and similar components are often denoted by similar symbols.

The present disclosure is further explained in combination with drawings and embodiments.

The track of tornado is generally spiral line, first, an assumption is as follows.

Tornado is assumed as a particle stream, its overall movement is regarded as moving coordinate, and the object A (the lightweight turbolators of the invention) sucked by the tornado is equivalent to a particle, which is regarded as moving point. The moving point moves in spiral and spin mode when it is still involved in tornado. Tornado is in spiral motion in coordinate system, and simplified force analysis is made by decomposing the spiral movement of equivalent particle of the object A into circling motion in XY plane and rectilinear motion in Z plane. and using moving point as research subject.

In Z direction, due to the lift force $F_z$ caused by air pressure difference, the object is affected by pressure-gradient force $F_p$, the air pressure is extremely low in the bottom of tornado, and the air pressure is increased gradually from bottom to top, so the object is under downward pressure-gradient force. The velocity differences exist in different locations in tornado field, and the object moving in wind field is also affected by Saffman lift force $F_{sz}$. From the microcosmic aspect, there are innumerable irregular vortexes in tornado field and internal flow is turbulent flow, and the magnitude and direction of $F_{sz}$ are changing every second, therefore, the reacting force from turbolator will partly block the regular motion of tornado. The gravity of the object is assumed as G, the mass as m, the resultant force in Z direction as $F_{z0}$, the acceleration as $a_z$; according to Newton's law:

$$F_{z0}=ma_z=F_z-G-F_p+F_{sz} \quad (1)$$

In the gravity direction of the object A, spin motion is produced due to the imbalance wind, and rotational inertial of the object A is regarded as J, angular acceleration as $a_z'$, and torque as M1, then:

$$M1=Ja_z' \quad (2)$$

Meanwhile, the object A (turbolator) does spin motion in flow field, the air from different sides of object brings the Magnus force $F_m$ on turbolator. Due to its irregular spin motion, turbolator would break small vortexes in the tornado, thus decreasing the turbulent flow strength in the wind filed.

In XY plane, the moving point is acted as circling motion, then M=Ja, where M is generated by the air pressure difference of moving point, J is rotational inertia, and a is angular acceleration.

In radial direction of XY plane, outward force F1 is formed by the pressure difference on the front side of the moving point, and inward force F2 is formed by the pressure difference on the back side of the moving point, normal acceleration is assumed as $a_n$, normal resultant force is as $F_n$, according to Newton's law.

$$F_n = ma_n = F_2 - F_1 \quad (3)$$

When F1>F2, the moving point generates centrifugal movement and does projectile motion without involving in particle flow of tornado; when F1<F2, the moving point generates centered motion. The object A in the tornado is assumed as multiple turbolators with different mass, and after they are connected through ropes, due to different mass, the high-mass turbolator is affected by large centrifugal force and is easily to be thrown out of cyclone tube of tornado, then dragged into the tube under pull force of the rope, which is conducive to interrupt regular motion of tornado. The low-mass turbolator is affected by large centripetal force and moves with wind continually, increasing resistance and consuming energy of tornado.

In tangential direction of XY plane, $a_\tau$ tangential acceleration caused by change of angular velocity of circular motion, $F_\tau$ is tangential resultant force caused by pressure difference on sides of turbolator so:

$$F_\tau = ma_\tau \quad (4)$$

The turbolator moves in different position because of wind pressure difference, interrupts spin regulation, blocks tornado movement and consume its energy. There is pressure dynamic—$\rho v^2/2$, on sides of turbolator, and side pressure is $F = C_L * \rho v^2/2 * S * \xi$, from which we can see that windward area S and resistance coefficient $C_L$ are the influence factors of side pressure which affect the positions of turbolator. If we consider countless moving points as one point, then the synergism of large point would consume energy of tornado.

Relative movement, and momentum transfer are existed between the object A (turbolator) and air. Air has drag force on the surface of turbolator, and the surface of turbolator has resistance to air, if these turbolators have rough surface and large roughness, then the resistance to air will be increased.

The peripheral wind speed can reach 100-200 m/s, the internal wind speed can reach 200-300 m/s, and the object A (turbolator) is affected by pressure resistance in high-speed fluid, and with the increase of moving speed, the pressure resistance will be increased, and the counter-acting force of turbolator on air will also be increased.

If mechanical analysis of single turbolator is extended to turbolator group formed by tandem connection of tens of thousands of turbolators, then the resistance of each turbolator on cyclone movement of tornado would be enhanced, so that regular cyclone movement of tornado will be broke and required energy of cyclone tube will be weakened, thereby breaking the formation of tornado to a great extent.

According to the analysis above, this invention discloses a method for weakening tornado, comprising A. providing plenty of non-fixed turbolators, which is called free turbolators. B. providing plenty of turbolators fixed on ropes and the ropes are non-fixed, which is called free turbolator strings. C. providing plenty of turbolators fixed on ropes and at least one point of the rope is fixed, which is called swinging turbolator strings and D. Installing free turbolators, free turbolator strings and swinging turbolator strings, in order to weaken cyclone energy of tornado.

And the method further comprises: E. connecting free turbolator strings and/or swinging turbolator strings to be stereo-network and F. storing free turbolators, free turbolator strings and swinging turbolator strings in advance.

Regarding to step A, turbolators are made of lightweight materials. "Lightweight materials" is opposite to heavy materials, which means objects made of low specific gravity materials. These lightweight turbolators can be satisfied to be blew out to the air under certain wind strength (for instance, 8 level above). Furthermore, turbolators are made of insulating materials, in order to isolate electric field and reduce electric energy. The insulated turbolators can decrease energy of electric field of tornado. The insulativity of turbolators meets the requirement of insulator ($10^9$-$10^{22}$ Ω·m). The best options are: turbolator barycenters is not geometric centers; and these turbolators are different in shape, size and mass, and has rough surface. Turbolators are sorted into three types, solid turbolators, hollow turbolators and inflatable turbolators; and turbolators are made of flexible material.

Regarding to step B, the method of fixing turbolators on ropes could be any means in prior art, such as bondage, using fixture and/or injection molding. Meanwhile, turbolators fixed on ropes randomly have different shapes, sizes and mass, tornado energy thus can be consumed greatly according to description above. In a preferred embodiment, turbolators, the configuration on each rope is different from others, energy consumption could be further enhanced. It needs to be explained that "rope" means rope-like objects with certain flexibility and certain length, not common rope in normal life.

Regarding to step C, generally, one free end of rope is fixed, so that the rope has a length to swing freely. However, any one spot of rope could be fixed, for instance, the middle is fixed to make two free swing ropes, although the rope length is reduced in half. And other methods to fix can be taken as long as at least one spot of ropes is fixed. Usually, ropes are fixed in tornado-prone areas, including suburban areas, open fields, glass fields, lakes, coastal areas etc. The rope can be fixed on specified devices (to be described below), earth surface, high and tall windbreak trees and/or high bracket etc.

Regarding to step E, the purpose of twisting the free turbolator strings and/or swinging turbolator strings to be stereo-network structure is to reduce tornado energy by letting turbolator strings move irregularly in tornado funnel.

Regarding to step F, the purpose of storing the free turbolators, free turbolator strings and swinging turbolator strings in storage boxes in advance is as follows: turbolators and ropes take too much space, so storing them into boxes in advance and opening box covers automatically or manually until tornado coming, in order to save space. For example, storing these free turbolators, flee turbolator strings and swinging turbolator strings in storage boxes, and opening devices (automatically by electric power and/or manually by wind power) installed on storage boxes.

In this way, all the turbolators, including non-fixed turbolators, free turbolator strings fixed on free ropes, swinging turbolator strings fixed on ropes, are all used for weakening tornado energy. It needs to be explained that step A, B, C, D, E and F are not in a sequence.

According to description above, this invention also discloses a device for weakening tornado. There is a embodiment of this device shown in FIG. 2, an embodiment of the invention, including plenty of non-fixed and independent turbolators 2, which is called free turbolators; plenty of turbolators 2 fixed on several free ropes 3, which is called free turbolator strings; plenty of turbolators fixed on ropes 3 i and at least one point of ropes is fixed, which is called swinging turbolator strings. In the embodiment, installing these free turbolators, free turbolator strings and swinging turbolator strings at proper areas (where tornado probably form or frequently happened area in history). In this embodiment, the device further contains a storage box 1, ropes 3 for swing turbolator strings are fixed on the storage box, and the storage box 1 is further used for storing the fixed ropes 3 (swinging turbolator strings), other non-fixed ropes 3 (free turbolator strings) and independent non-fixed turbolators 2 (fee turbolators).

Preferably, the storage boxes 1 is installed in tornado-prone areas fixedly.

Preferably, turbolators are all made of lightweight materials, and the barycenters are not geometric centers.

The lightweight turbolators 2 include solid turbolators and/or hollow turbolators and/or inflatable turbolators with rough surface, different shapes, sizes and mass.

For instance, solid turbolators could be foam and can be made of plastic foam materials including polyethylene (PE), polyprolene (PP), polyurethane (PU), polystyrene PS), polyethylene terephthalate (PET), polyvinyl chloride (PVC), acrylonitrile-butadiene-styrene copolymer (ABS) etc. Hollow turbolators could be modified plastic foam, such as PE, PP PU, PS, PET, PVC, ABS etc. Inflatable turbolators could be made of nylon fabric, polyester fabric, cotton polyester, rubber plastic foils or paper materials with different thickness.

Lightweight turbolators described above are made of PE, PP, PU, PS, PVC, ABS, nylon fabric, polyester fabric, cotton polyester, rubber plastic foils or paper materials. because of their small specific gravity and good insulativity, turbolators could isolate electric field between clouds and earth, so as to reduce electric strength and weaken energy of electric field. On the other hand, the materials are lightweight and soft, which are not easily to harm to living beings when falling off.

The lightweight turbolators 2, are lightweight inflatable body of multilateral regular and irregular prism, circular cone, pyramid, and other polyhedral solid or hollow body, fan blade shape, hang gliding shape, spiral shape, kite shape or bowl shape with different shapes. The gravity of lightweight turbolators 2 deviates from geometric center or center of rotation, so that the turbolators move as irregular motion under wind and may interrupt regular spin motion of tornado. If there are enough turbolators using in the original stage of tornado, the disaster can be prevented.

Some lightweight turbolators are connected together by ropes made of tensile fibers, includes modified polyethylene, polypropylene, nylon wire or hemp rope. The dotted line in FIG. 2 shows rope 3, a large number of turbolators 2 are connected to be turbolator strings by rope 3, part of them are fixed to storage boxes, which is called swing turbolator strings, while others are fixed to free ropes 3, which is called free turbolator strings which could be blew out of boxes easily and enhance wind resistance. Meanwhile, there are plenty of free and independent turbolators 2 in boxes installed in tornado-prone areas. Preferably, the non-fixed or fixed ropes can be chosen randomly to form a stereo-network structure, and the outer diameter of unfolded stereo-network structure is similar to diameter of ground terminal of tornado.

There are several sensors (not shown in figures) for testing wind speed, wind force and wind direction in storage boxes 1 with manually or automatically opening covers 12 and plenty of air holes 11 to ensure that turbolators 2 would be blew out easily in the initial stage.

The devices are installed in tornado-prone areas, including suburban areas, fields, grasslands, lakes and coastal areas, when the inner sensors detect the tornado, the box covers 12 will be opened automatically or in manually. The dotted line in FIG. 2 shows the track 4 of tornado, a large number of turbolators are blew out and involved in tornado, and turbolators 2 made of air bags will be swelled out with air. According to the character of barycenters, every lightweight turbolators 2 could block wind force while moving irregularly. Turbolators 2 would damage spin motion, strengthen turbulence and make it impossible for tornado to do regular motion. In addition, there are interactions between turbolators 2, so that turbolators 2 are difficult to be thrown out of tornado, thereby and enhancing interruption effect on tornado.

After consuming tornado energy, inflatable air turbolators 2 shrink and fall rapidly, hollow turbolators 2 and solid turbolators, which can be recycled. The turbolators 2 are made of lightweight and flexible material to prevent the injury and damage to people and buildings.

Above disclosure are merely some preferred embodiments of the present invention, but the present invention is not limited thereto. For example, the turbolator 2 can be placed in low storage box 1, or placed on high windbreaks, or the storage box 1 is provided on high bracket.

The present invention is described and explained in combination with preferred embodiments, however, it should be understood that various changes made by those skilled in the art without departing from the spirit and scope of the appended claims of the present invention shall be included in the protection scope of the present invention.

The invention claimed is:

1. A device for weakening a tornado energy in the initial forming stage of a tornado comprising:
   a storage box;
   a plurality of turbolators having a resistivity of $10^9$-$10^{22}$ $\Omega \cdot m$;
   a part of the turbolators are fixed on ropes to form turbolator strings;
   a part of the turbolator strings are fixed to the storage box and stored in the storage box to form fixed turbolator strings;
   a part of the turbolator strings are stored in the storage box without fixing to the storage box to form non-fixed turbolator strings;
   wherein the fixed turbolator strings and the non-fixed turbolator strings are connected to form a stereo-network;
   barycenters of the plurality of turbolators deviates from the geometric center of the turbolators;
   a plurality of air holes are provided on the storage box; the plurality of turbolators are blown out of the storage box when wind passes through the air holes.

2. The device of claim 1, wherein the storage box further comprises a cover, and the cover opens manually.

3. The device of claim 1, wherein the shape of the turbolators comprise multilateral regular and irregular prism, circular cones, pyramids, vanes, hang gliding shape, spirals shape, kite shape and bowl shape; the turbolators move irregularly under wind action.

4. The device of claim 1, wherein the ropes are made of a modified fiber of modified polyethylene, polypropylene, nylon wire and hemp ropes.

5. The device of claim 1, wherein the turbolators comprise solid turbolators, hollow turbolators and inflatable turbolators.

6. The device of claim 1, wherein the solid turbolators are made of foamed plastic materials; the foamed plastic material comprises one or more of polyethylene, polyprolene, polyurethane, polystyrene, polyethylene terephthalate, polyvinyl chloride, and acrylonitrile-butadiene-styrene copolymer.

* * * * *